United States Patent [19]
Reed et al.

[11] Patent Number: 5,207,924
[45] Date of Patent: May 4, 1993

[54] DIALLYL DIMETHYL AMMONIUM CHLORIDE COPOLYMERS IN DEINKING PROCESS WATER CLARIFICATION

[75] Inventors: Peter E. Reed, Naperville; Karen R. Tubergen, Mt. Prospect, both of Ill.

[73] Assignee: Nalco Chemical Company, Naperville, Ill.

[21] Appl. No.: 901,310

[22] Filed: Jun. 19, 1992

[51] Int. Cl.$^5$ .............................................. C02F 1/56
[52] U.S. Cl. .................................. 210/734; 210/917; 210/928; 162/5
[58] Field of Search ............... 210/733, 734, 735, 917, 210/928, 908; 162/5

[56] References Cited
U.S. PATENT DOCUMENTS

| | | |
|---|---|---|
| 2,471,959 | 5/1949 | Hunt . |
| 3,147,218 | 9/1964 | Booth et al. ........................ 210/734 |
| 3,414,547 | 12/1968 | Thompson et al. . |
| 3,461,163 | 8/1969 | Boothe .............................. 210/734 |
| 4,673,511 | 6/1987 | Richardson et al. ............... 210/734 |
| 4,715,962 | 12/1987 | Bhattacharyya et al. .......... 210/708 |
| 4,835,234 | 5/1989 | Valint et al. ...................... 210/734 |
| 5,013,456 | 5/1991 | St. John et al. ................... 210/734 |

Primary Examiner—Stanley S. Silverman
Assistant Examiner—Neil M. McCarthy
Attorney, Agent, or Firm—Robert A. Miller; John G. Premo

[57] ABSTRACT

Novel copolymers of polydiallyl dimethyl ammonium chloride and 3-acrylamido-3-methylbutanoic acid are useful in the clarification of deinking paper mill waste water resulting from the processing of recycled paper stock.

3 Claims, 1 Drawing Sheet

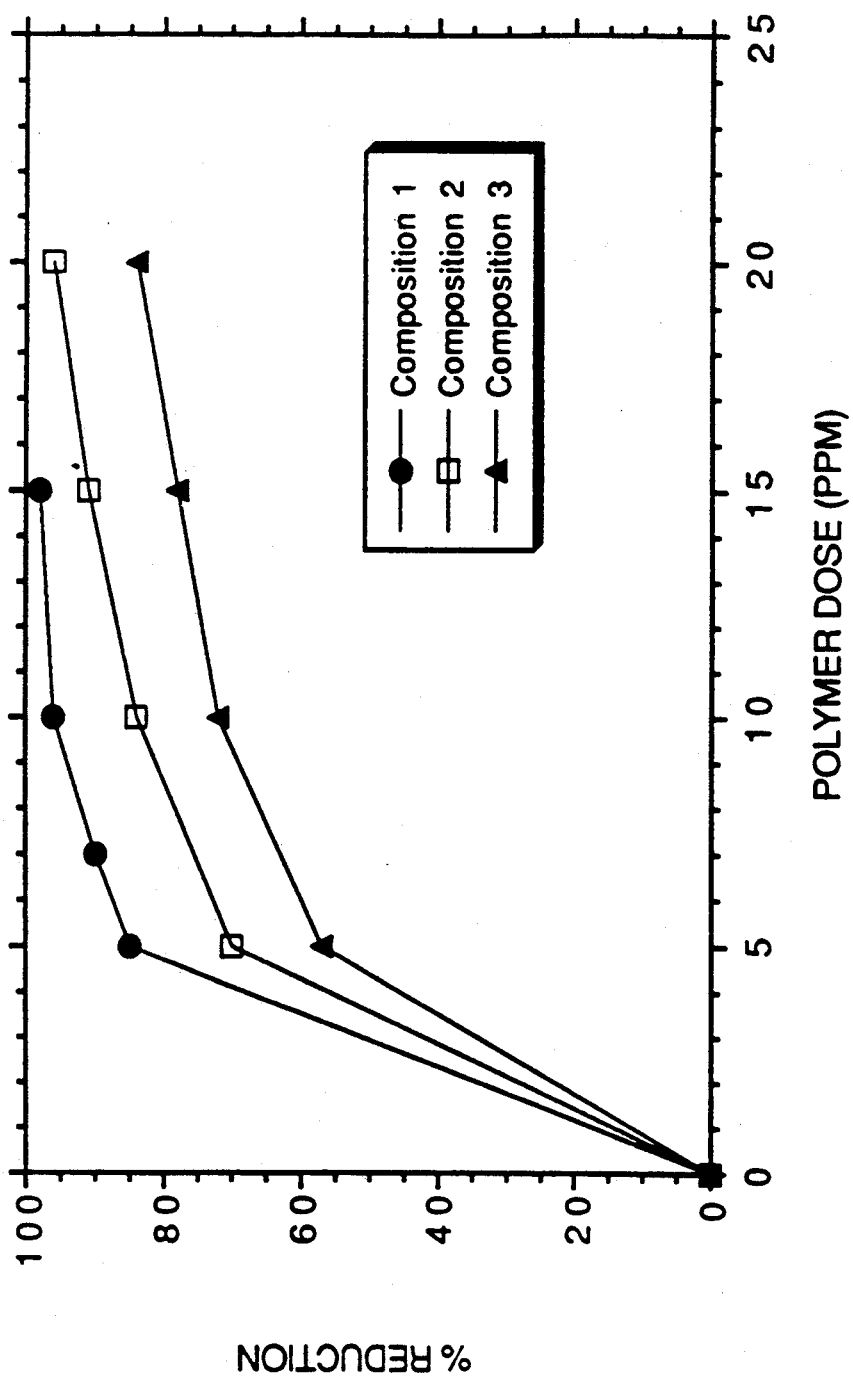

5,207,924

DIALLYL DIMETHYL AMMONIUM CHLORIDE COPOLYMERS IN DEINKING PROCESS WATER CLARIFICATION

GENERAL FIELD OF THE INVENTION

The invention relates to the clarification of deinking process waters which result from the processing of recycled paper using as a coagulant a diallyl dimethyl ammonium chloride copolymer of 3-acrylamido-3-methylbutanoic acid.

INTRODUCTION

Recycled paper is increasingly used as a pulp source. One of the major pulping steps involves removal of the ink from any source of printed recycled paper. Large volumes of water are required for the ink removal process and its clean-up is accomplished using a solids/liquid separation unit operation. Dissolved air flotation (DAF) is commonly used. Recycle mills are most frequently located in the metropolitan areas where an emphasis on closing the water cycle of the mill is great. Consequently, effective clean-up of the deinking wash waters becomes important because reuse of the water generated e.g. from a DAF, can lead to reduced sheet quality such as brightness. Also, if these waters are used for other purposes, minimizing the amounts of BOD/COD and suspended solids is desirable.

It is common to coagulate the suspended solids contained in the deinking process waters by using as a coagulant a water soluble cationic polymer. One of the polymers that has met with some success is polydiallyl dimethyl ammonium chloride, hereafter (DADMAC). One of the drawbacks in using this coagulant is that it is relatively expensive and the dosages necessary to effectuate good coagulation is often excessive. If it were possible to provide a more effective coagulant other than DADMAC, an improved clarification of waste deinking process waters would be afforded.

Two note worthy attempts which have improved the efficiency of diallyl dimethyl ammonium chloride as a deinking agent are disclosed U.S. Pat. Nos. 4,715,962 and 5,013,456. Both of these patents show that certain specific copolymers of diallyl dimethyl ammonium chloride with anionic monomers, such as acrylic acid, improve efficiency of diallyl dimethyl ammonium chloride as a deinking water coagulant.

It would be of benefit to the paper recycling industry if it were possible to provide an improved deinking water coagulant based upon copolymers of diallyl dimethyl ammonium chloride, which is a known effective deinking water clarification agent.

THE INVENTION

The invention comprises an improvement in the process of the type wherein a coagulating amount of a water soluble polymer is used to coagulate suspended solids from deinking process waters which result from the processing of recycled paper. The improvement comprises using as the coagulant polydiallyldimethyl ammonium chloride copolymer which contains from between 1-30 mole percent of 3-acrylamido-3-methylbutanoic acid(AMBA). This copolymer is further characterized as having an Intrinsic Viscosity of at least 0.5, and preferably greater than 1.

THE DRAWING

The drawing illustrates the superiority of the copolymers of the invention as deinking coagulants.

THE DADMAC-AMBA COPOLYMERS

In a broad aspect of the invention these copolymers contain from 1-30 mole percent of 3-acrylamido-3-methylbutanoic acid. When used as deinking coagulants, they preferably contain between 5-30 mole percent and most preferable 5-20 mole percent.

The polydiallyl dimethyl ammonium chloride 3-acrylamido-3-methylbutanoic acid copolymers of the invention to be effective for most commercial applications should have an intrinsic viscosity of at least 0.5. A general range is 0.5-5. Most often an effective intrinsic viscosity within the range of 1 to 5.

While the copolymers of the invention are described and claimed with respect to the free acid form of 3-acrylamido-3-methylbutanoic acid, it is understood that they are also either prepared or in the process which they are applied are converted to their alkali metal salt form. Typically, the butanoic acid form of the 3-acrylamido-3-methylbutanoic acid will be in the sodium salt form, or at least a portion of the butanoic acid will be converted to the sodium salt form. Ammonium and amine salts may be useful in some applications.

The polydiallyl dimethyl ammonium chloride 3-acrylamido-3-methylbutanoic acid polymers are most conveniently prepared by a solution polymerization technique utilizing free radical catalysts. When the preferred solution polymerization techniques are employed, they result in the preparation of polymer solutions having an active polymer content ranging from between about 5 to 30%. Generally the concentration will be 10% to 20%. These concentrations are convenient for purposes of transporting the polymer. They would be diluted at the point of use.

While solution polymerization using free radical catalysts is a preferred method of preparing the polymers, it is understood that they may also be prepared in the form of water-in-oil emulsions using a so called inverse emulsion polymerization technique. The method of polymerizing polydiallyl dimethyl ammonium chloride by inverse emulsion polymerization is described in detail in U.S. Pat. No. 4,715,962. The disclosure of this patent is incorporated in reference.

METHOD OF PREPARING THE DADMAC-AMBA COPOLYMERS

As indicated, the preferred method of preparing the polydiallyl dimethyl ammonium chloride 3-acrylamido-3-methylbutanoic acid copolymers is by solution polymerization in the presence of a free radical catalyst. In order to achieve the higher intrinsic viscosities it has been found that the polymerization should be conducted in the presence of about 1 to 30 percent or more by weight of an inorganic salt based on monomer. This polymerization scheme is described in U.S. application, Ser. No. 07/871,300 Filed Apr. 20, 1992, Entitled, *Process of Polymerizing Diallyldialkyl Ammonium Compounds to Produce Higher Molecular Weight Polymers*. The disclosure of this Application is incorporated herein by reference.

GENERAL SYNTHETIC PROCEDURE

1. The polymerization mixture is prepared by adding a solution of diallyl dimethyl ammonium chloride, sodium chloride, deionized water, the tetrasodium salt of ethylenediamine tetraacetic acid (EDTA) and a portion of the 3-acrylamido-3-methylbutanoic acid into a reaction vessel equipped with a stirrer, nitrogen inlet, condenser, heater, and thermometer.

2. The polymerization mixture is then heated, purged with nitrogen, and maintained at a specific temperature falling within the range between 40°-90° C.

3. An free radical initiator solution is then slowly added over a 16 hr. period. During this period, an aqueous solution of the remaining 3-acrylamido-3-methylbutanoic acid comonomer is added to the polymerization mixture. Optionally, up to 35% (based on monomer solids) deionized water may also be added during this period.

4. After a period of time sufficient to allow conversion of the diallyl dimethyl ammonium chloride monomer to exceed 80%, the final initiator solution is added and the temperature is raised (if necessary) to between 80°-90° C. for a period of time sufficient to raise the conversion to greater than 90%.

5. The reaction mixture is then diluted with an amount of deionized water sufficient to bring the polymer concentration to between 10-40 wt %.

| EXAMPLE 1 Solution of a 14 mole % AMBA Copolymer ||
|---|---|
| 67% DADMAC monomer solution | 250 gm |
| Sodium chloride | 30.5 gm |
| Deionized water | 18.5 gm |
| EDTA | 0.05 gm |
| AMBA | 14.0 gm |
| 3.6% VAZO-50* solution | 51.9 gm |
| 10.7% AMBA solution | 140 gm |
| 1.5% VAZO-50 solution | 127 gm |
| Deionized water | 678 gm |

*Azo catalyst

| EXAMPLE 2 Solution of a 5 mole % AMBA Copolymer ||
|---|---|
| 67% DADMAC monomer solution | 250 gm |
| Sodium chloride | 30.5 gm |
| Deionized water | 18.5 gm |
| EDTA | 0.05 gm |
| AMBA | 5.0 gm |
| 3.6% VAZO-50 solution | 51.9 gm |
| 3.3% AMBA solution | 155 gm |
| 2.3% VAZO-50 solution | 81.9 gm |
| Deionized water | 591 gm |

EVALUATION OF DADMAC AMBA COPOLYMERS AS DEINKING COMPOSITIONS

Dosage

The general dosage of the polymers is between 0.5-100 parts per million (ppm), based on the weight of the deinking process waters. A preferred dosage range is 5-75 ppm with a most preferred range being 5-50 ppm. It is understood that routine experimentation in any particular case will be required to ascertain the optimum dosage.

The samples tested were taken from a paper mill located in the eastern portion of the United States. These samples were taken from the DAF section of the mill.

Deink washing samples of 200 mls were used for testing. The jar test mixing and polymer addition conditions are given in Table III.

| TABLE ||
|---|---|
| JAR TEST TIMING SEQUENCE ||
| SEQUENCE | 1. 2 min. rapid mix (200 RPMs max. RPMs) |
| | 2. 3 min. slow mix (20 RPMs) |
| | 3. 5 min. settling period |
| | 4. Extract supernatant sample and measure turbidity. |
| POLYMER ADDITION: | 1. Coagulant added at beginning of fast mix. |
| | 2. Flocculent added at end of rapid mix. last 40 secs. |

Polymer activity was evaluated by graphing percent turbidity reduction as a function of polymer dose. A turbidity reduction of at least 70% is essential with greater than 80% preferred.

Using the above described test method, two compositions of the invention were tested.

Composition 1 is the polydiallyl dimethyl ammonium chloride AMBA polymer of Example 1.

Composition 2 is a commercial polydiallyl dimethyl ammonium chloride homopolymer that had been used for deinking water clarification in a variety of paper mills.

Composition 3 is a commercial epichlorohydrin-dimethyalmine copolymer which has been used commercially in deinking.

In all of these tests it should be noted that the samples were finally treated with 2.5 parts per million of polymeric flocculent which was commercial acrylamide, sodium acrylate flocculent which is commonly used as a flocculent in the treatment of recycled paper mill effluent which utilize cationic coagulants. The results of the tests using the compositions described are set forth in the Drawing.

It is evident upon observing the test data set forth in the Drawing that the polydiallyl dimethyl ammonium chloride 3-acrylamido-3-methylbutanoic acid polymers are superior to the prior art deinking coagulants.

Having thus described our invention it is claimed:

1. A process wherein a coagulating amount of a water soluble polymer is used to coagulate suspended solids from deinking process waters which result from the processing of recycled paper, the improvement which comprises using as the coagulant a polydiallyl dimethyl ammonium chloride copolymer which contains from between 1-30 mole percent of 3-acrylamido-3-methylbutanoic acid and has an intrinsic velocity of at least 0.5.

2. The process of claim 1 where the copolymer contains between 5-30 mole percent of 3-acrylamido-3-methylbutanoic acid and has an intrinsic viscosity within the range of between 0.5-5.

3. The process of claim 1 here the copolymer contains between 5-20 mole percent of 3-acrylamido-3-methylbutanoic acid and has an intrinsic viscosity within the range of between 1-5.

* * * * *